(12) United States Patent
Yamada et al.

(10) Patent No.: US 11,371,865 B2
(45) Date of Patent: Jun. 28, 2022

(54) SENSOR UNIT AND ELECTRONIC DEVICE

(71) Applicant: SEIKO EPSON CORPORATION, Tokyo (JP)

(72) Inventors: Masayoshi Yamada, Chino (JP); Hikaru Iwai, Matsukawa-machi (JP); Kanechika Kiyose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 327 days.

(21) Appl. No.: 16/713,653

(22) Filed: Dec. 13, 2019

(65) Prior Publication Data

US 2020/0191618 A1 Jun. 18, 2020

(30) Foreign Application Priority Data

Dec. 14, 2018 (JP) .............................. JP2018-234130

(51) Int. Cl.
*G01D 11/24* (2006.01)
*B41J 2/175* (2006.01)
*G01S 3/00* (2006.01)

(52) U.S. Cl.
CPC .......... *G01D 11/245* (2013.01); *B41J 2/1752* (2013.01)

(58) Field of Classification Search
CPC ............... G01S 3/00; G01N 3/00; G01N 7/00
See application file for complete search history.

(56) References Cited

U.S. PATENT DOCUMENTS

| 6,237,833 | B1* | 5/2001 | Ikoma ................. | B23K 31/125 |
| | | | | 219/85.18 |
| 2012/0060609 | A1* | 3/2012 | Fukutomi .......... | G01N 29/2493 |
| | | | | 73/592 |
| 2013/0215722 | A1 | 8/2013 | Wu et al. | |
| 2015/0119717 | A1* | 4/2015 | Yoshida ............... | A61B 8/4494 |
| | | | | 600/447 |
| 2015/0381848 | A1* | 12/2015 | Matsui ................ | H04N 1/0281 |
| | | | | 358/482 |
| 2017/0110504 | A1* | 4/2017 | Panchawagh ........ | H01L 41/311 |
| 2017/0121136 | A1* | 5/2017 | Ohmori ............... | B41J 11/0095 |

FOREIGN PATENT DOCUMENTS

JP 2013-172449 A 9/2013

* cited by examiner

*Primary Examiner* — Jermele M Hollington
*Assistant Examiner* — Temilade S Rhodes-Vivour
(74) *Attorney, Agent, or Firm* — Oliff PLC

(57) ABSTRACT

A sensor unit includes a sensor device, a holder that holds the sensor device and includes a surface maintained at a reference potential, and a case that houses the holder, in which the case includes a mounting surface in contact with a mounting object, and the mounting surface is provided with a communication portion that causes an inside and an outside of the case to communicate with each other, and the holder includes a protrusion that protrudes from the communication portion and comes in contact with the mounting object.

6 Claims, 9 Drawing Sheets

SENSOR UNIT AND ELECTRONIC DEVICE

The present application is based on, and claims priority from JP Application Serial Number 2018-234130, filed Dec. 14, 2018, the disclosure of which is hereby incorporated by reference herein in its entirety.

BACKGROUND

1. Technical Field

The present disclosure relates to a sensor unit and an electronic device.

2. Related Art

In related art, a sensor unit having an ultrasound sensor that transmits ultrasounds housed in a case is known (for example, see JP-A-2013-172449).

JP-A-2013-172449 discloses a sensor unit having an ultrasound device fixed to a holder provided with a circuit unit, in which the holder is housed in a case. The circuit unit includes a lead wire connected to the ultrasound device, a control wire connected to an external control means, and a ground wire connected to an inner peripheral surface of the case.

In the sensor unit as described above, when an electromagnetic wave is input from the outside, the ultrasound device may malfunction or the detection sensitivity of the ultrasound device may be reduced. For this reason, it is common that the case itself, which is connected to the circuit unit with the ground wire, is made of metal, or the case surface is covered with metal plating to connect the ground wire to the metal plating, so that the connection destination of the ground wire is the reference potential, thereby providing a shielding effect against electromagnetic waves.

However, when the case is formed of metal, the cost is higher than when the case is formed of synthetic resin. For this reason, in consideration of manufacturing costs, it may form the case from a synthetic resin and form metal plating on the surface of the case connected to the ground wire. Meanwhile, when a sensor unit is incorporated in an electronic device, the sensor unit and a mounting object to which the sensor unit is mounted may be set to the same potential. However, when the case is formed from a synthetic resin so that the metal plating is formed, there is a problem that a terminal portion and a connection line for connecting the metal plating and the mounting object are additionally required.

SUMMARY

A sensor unit according to a first application example includes a sensor device, a holder that holds the sensor device and of which surface is maintained at a reference potential; and a case that houses the holder, in which the case includes a mounting surface that is in contact with a mounting object, the mounting surface is provided with a communication portion that causes an inside and an outside of the case to communicate with each other, and the holder includes a protrusion that protrudes from the communication portion and is in contact with the mounting object.

In the sensor unit according to the application example, the sensor device may an ultrasound device that performs at least one of transmission of ultrasounds and reception of ultrasounds.

The sensor unit according to the application example may include a circuit substrate that controls the driving of the ultrasound device, the circuit substrate includes a ground electrode to which the reference potential is applied, and the holder is in contact with the ground electrode of the circuit substrate.

In the sensor unit according to the application example, the case may include an accommodation portion that houses the holder, and an inner peripheral wall of the accommodation portion may be provided with a conductive layer surrounding the holder and in contact with the holder.

In the sensor unit according to the application example, the case may include a first case and a second case, and the communication portion is configured by a gap between the first case and the second case, and the protrusion may be interposed between the first case and the second case.

An electronic device according to a second application example includes the sensor unit according to the application example described above, and the mounting object to which the mounting surface of the case is mounted and with which the protrusion comes in contact.

DESCRIPTION OF EXEMPLARY EMBODIMENTS

Hereinafter, an embodiment according to the present disclosure will be described.

Figure 1:
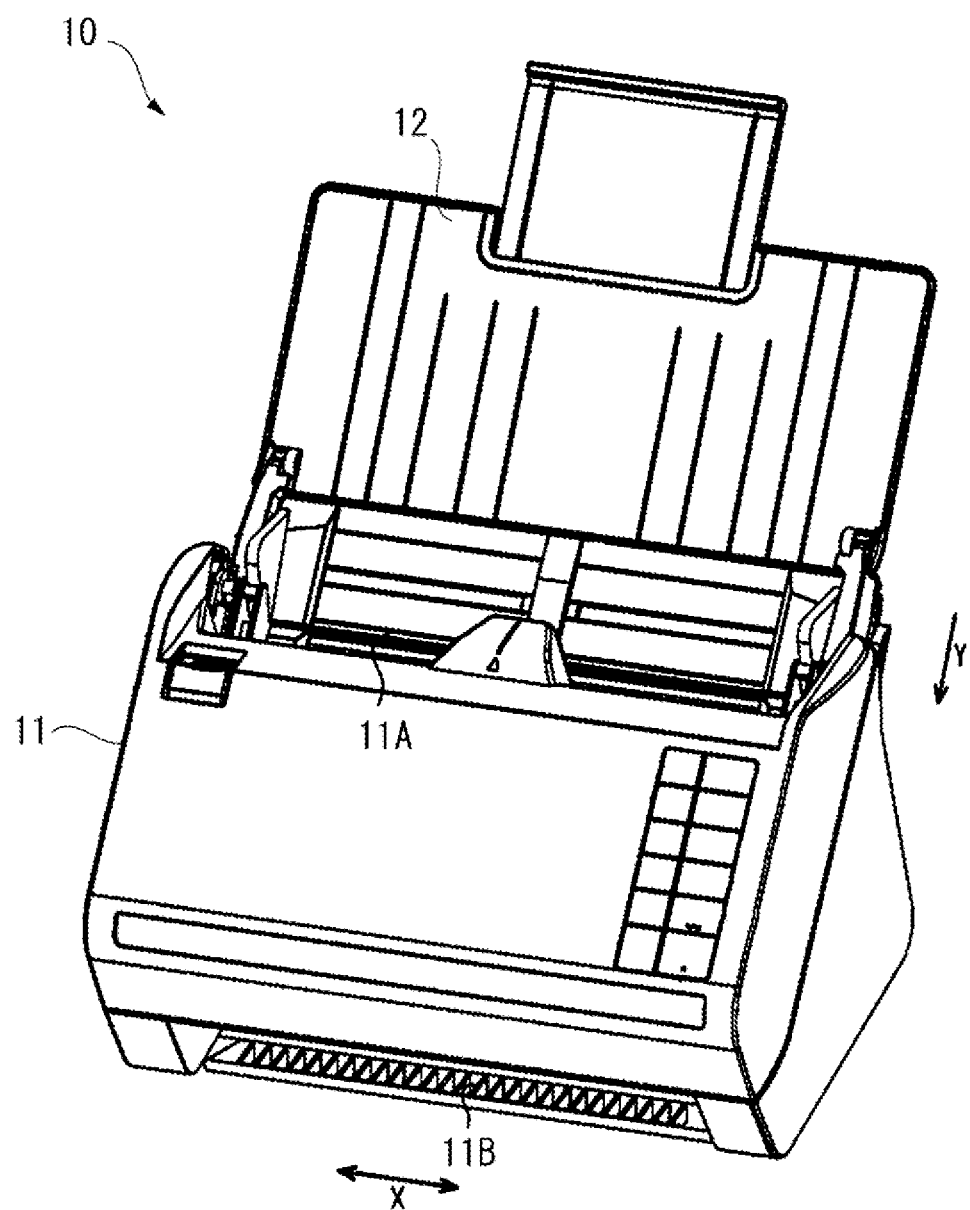
FIG. 1 is an external view showing a schematic configuration of an image scanner according to an embodiment of the present disclosure.
Figure 2:
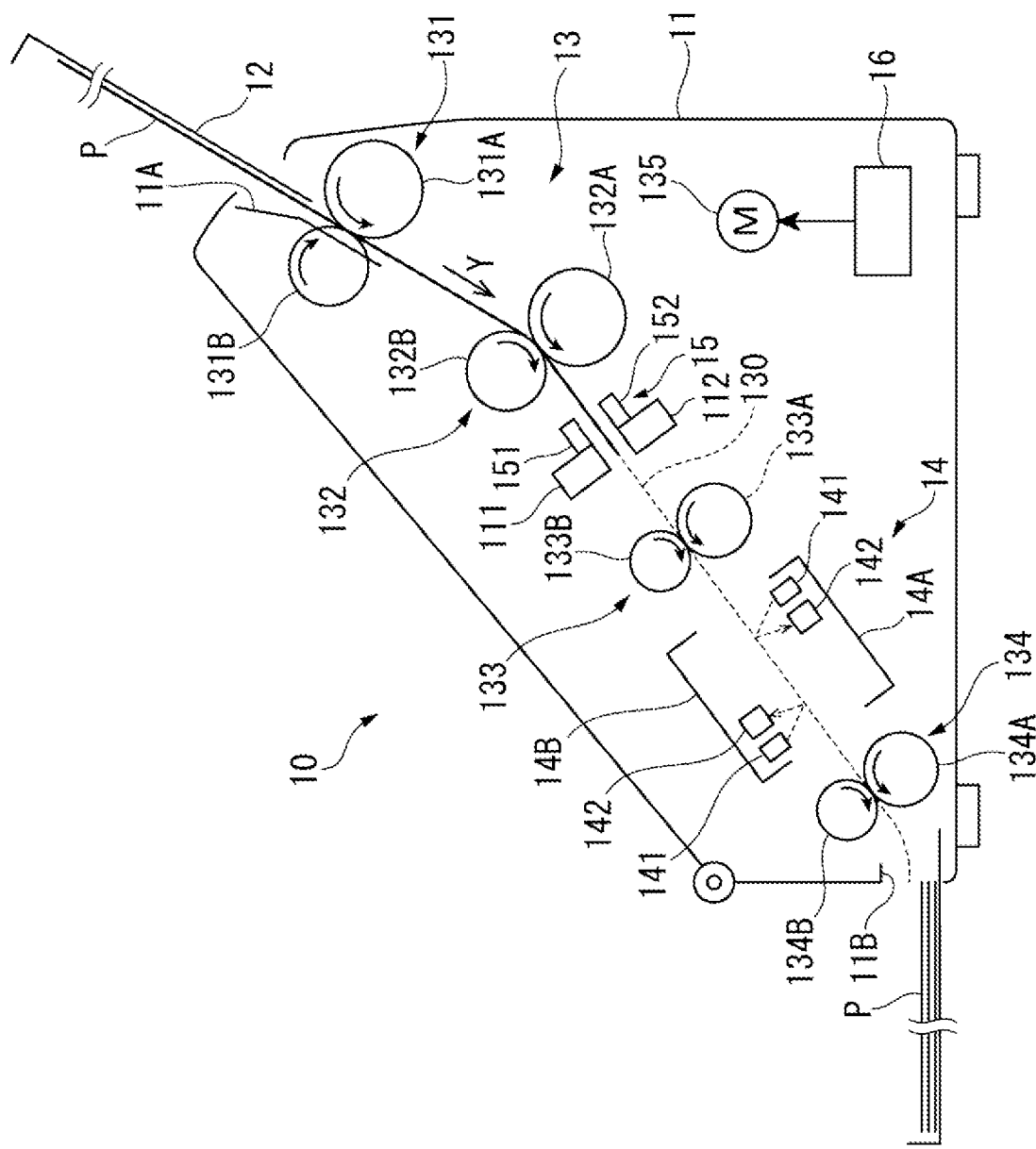
FIG. 2 is a side cross-sectional view illustrating an outline of a transport unit of the image scanner according to the present embodiment.

FIG. 1 is an external view showing a schematic configuration of an image scanner 10 according to the present embodiment. FIG. 2 is a side cross-sectional view showing an outline of the transport unit of the image scanner 10. FIG. 2 is a side sectional view showing the image scanner 10 when viewed from a main scanning direction (X direction) orthogonal to a transport direction (Y direction).

Schematic Configuration of Image Scanner 10

The image scanner 10 is an example of an electronic device, and the image scanner 10 includes an apparatus main body 11 and a paper support 12 as shown in FIG. 1. As shown in FIG. 2, inside the apparatus main body 11, a transport unit 13 that transports the paper P, a scanning unit 14 that reads an image of the transported paper P, an ultrasound sensor 15 that detects double feed of the paper P, and a control unit 16 that controls the image scanner 10 are provided. In the present embodiment, the example is shown, in which the ultrasound sensor 15 detects double feed of the paper P using the paper P as a target object, but the present disclosure is not limited thereto. Examples of the target object may include various media such as films and fabrics, for example.

As shown in FIGS. 1 and 2, the apparatus main body 11 is provided with a feed port 11A at a connection position with the paper support 12. The papers P placed on the paper support 12 are fed one by one to the feed port 11A. The fed paper P is transported along a predetermined transportation path 130 in the apparatus main body 11 by the transport unit 13. Then, after being read by the scanning unit 14 at the reading position in the middle of the transportation, the paper P is discharged from a discharge port 11B that opens at a lower front side of the apparatus main body 11.

Configuration of Transport Unit 13

The transport unit 13 transports a plurality of papers P set on the paper support 12 one by one in the transport direction (Y direction). That is, the transport unit 13 feeds the paper P sent from the feed port 11A while guiding it into the apparatus main body 11, and transports the fed paper P along a predetermined transportation path 130.

More specifically, the transport unit 13 includes a first feed roller pair 131 disposed at upstream (−Y side) of the transportation path 130 in the Y direction, and a second feed roller pair 132 disposed at downstream (+Y side) with respect to the first feed roller pair 131 in the Y direction. Further, the transport unit 13 includes a first transport roller pair 133 disposed at the −Y side with the reading position of the paper P interposed therebetween, and a second transport roller pair 134 disposed at the +Y side.

The first feed roller pair 131 includes a first drive roller 131A and a first driven roller 131B. Likewise, the second feed roller pair 132 includes a second drive roller 132A and a second driven roller 132B. Further, the first transport roller pair 133 includes a third drive roller 133A and a third driven roller 133B. Likewise, the second transport roller pair 134 includes a fourth drive roller 134A and a fourth driven roller 134B. Each of the driven rollers 131B to 134B is driven (rotated) by the rotation of the drive rollers 131A to 134A paired therewith, respectively.

The drive rollers 131A to 134A forming the roller pairs 131 to 134 are rotationally driven by the power of a transport motor 135 that is a power source thereof. The transport motor 135 is controlled by the control unit 16 and drives the drive rollers 131A to 134A.

The second driven roller 132B forming the second feed roller pair 132 is a retard roller, and the friction coefficient of an outer peripheral surface thereof with respect to the paper P is greater than the friction coefficient of an outer peripheral surface of the second drive roller 132A with respect to the paper P. For this reason, the second feed roller pair 132 serves as a separation mechanism that separates the paper P one by one and feeds it to the +Y side. Therefore, the plurality of papers P stacked on the paper support 12 are fed by the rotation of the first feed roller pair 131 into the apparatus main body 11 from the feed port 11A one by one in order from the uppermost one, for example, and then the papers are separated one by one by the rotation of the second feed roller pair 132 and fed to the +Y side.

Configuration of Scanning Unit 14

As shown in FIG. 2, a reading position for reading an image on the paper P is provided between the first transport roller pair 133 and the second transport roller pair 134 in the transportation path 130, and the scanning unit 14 is provided therein.

The scanning unit 14 includes a first scanning unit 14A and a second scanning unit 14B provided on both sides with the transportation path 130 interposed therebetween. The scanning unit 14 includes a light source 141 capable of irradiating the paper P being transported with a light, and an image sensor 142 extending in the main scanning direction (X direction). In a normal reading mode for reading a front surface of the paper P, the first scanning unit 14A performs a reading operation, and in a double-sided reading mode for reading the front and back surfaces of the paper P, both the first scanning unit 14A and the second scanning unit 14B perform the reading operation. The light source 141 and the image sensor 142 forming the first scanning unit 14A and the second scanning unit 14B are connected to the control unit 16 and perform a scanning processing for reading an image on the paper P under the control of the control unit 16.

Configuration of Ultrasound Sensor 15

The ultrasound sensor 15 is provided at a position between the second feed roller pair 132 and the first transport roller pair 133 in the transportation path 130. The ultrasound sensor 15 is a double feed sensor and detects double feed of the paper P transported by the transport unit 13.

The ultrasound sensor 15 includes a pair of sensor units. One of the pair of sensor units is a transmission unit 151 that transmits ultrasounds. The other of the pair of ultrasound elements is a reception unit 152 that receives ultrasounds.

As shown in FIG. 2, the transmission unit 151 is fixed to a transmission side mounting object 111 provided on the transportation path 130. The reception unit 152 is fixed to a reception side mounting object 112 provided on the transportation path 130. The transmission side mounting object 111 and the reception side mounting object 112 are members that are fixed to the apparatus main body 11, and may be a part of the housing of the image scanner 10, or may be a part forming the transport unit 13, such as, for example, a control unit of the transport motor 135 that drives the roller pairs 131 to 134, and the like.

Figure 3:
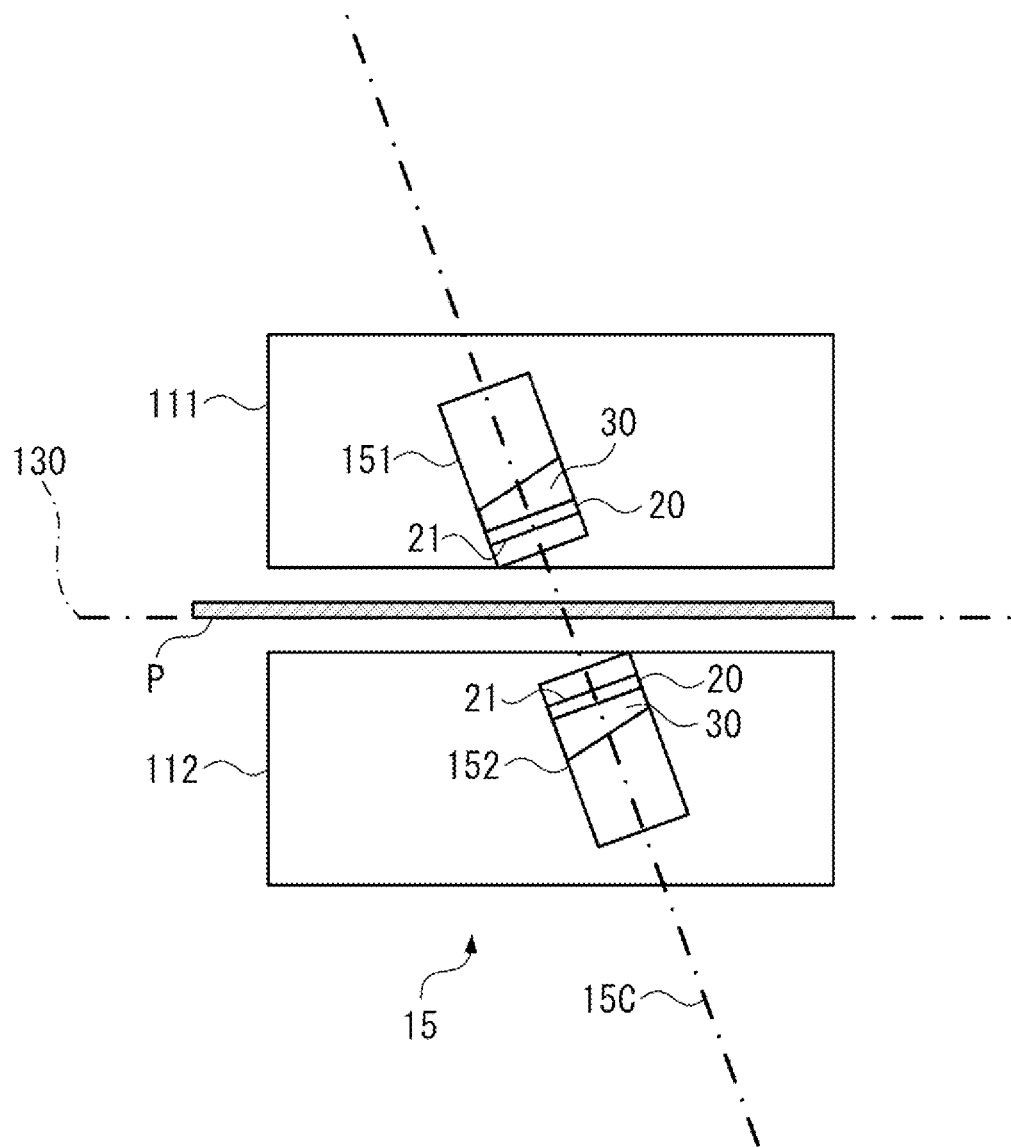
FIG. 3 is a schematic diagram for explaining a double feed detection method using the ultrasound sensor according to the present embodiment.

FIG. 3 is a schematic diagram for explaining a double feed detection method by the ultrasound sensor 15.

In the present embodiment, the transmission unit 151 and the reception unit 152 are opposed to each other on an axis of the sensor central axis 15C inclined with respect to the transportation path 130, as shown in FIG. 3, and are disposed with the transportation path 130 for transporting the paper P interposed therebetween.

In the ultrasound sensor 15, ultrasound is transmitted from the transmission unit 151 to the paper P transported along the transportation path 130 by the transport unit 13. The ultrasound transmitted from the transmission unit 151 is input to the paper P, and the ultrasound transmitted through the paper P is received by the reception unit 152. When the ultrasound is received by the reception unit 152, a reception signal corresponding to the sound pressure of the ultrasound received by the reception unit 152 is output, and double feed of the paper P is detected based on the signal intensity of the reception signal.

As shown in FIG. 3, the sensor central axis 15C is an axis that passes through the center of the transmission unit 151 and the center of the reception unit 152, and is transmission/reception direction of an ultrasound. The sensor central axis 15C may be inclined at an angle of 5° or more, and further, at an angle of 10° or more with respect to the normal line of the surface of the paper P transported to the transportation path 130.

When the sensor central axis 15C coincides with the normal direction of the surface of the paper P, there is a possibility that the ultrasound transmitted from the transmission unit 151 may undergo multi-reflections between the paper P and the transmission unit 151. In addition, there is a possibility that the ultrasounds past through the paper P undergo multi-reflections between the reception unit 152 and the paper P. In this case, in the reception unit 152, in addition to the ultrasound passing through the paper P from the transmission unit 151 and received by the reception unit 152, the ultrasounds multi-reflected between the paper P and the transmission unit 151, and the ultrasounds multi-reflected between the reception unit 152 and the paper P are also received by the reception unit 152, and accordingly, accurate double feed detection cannot be performed.

In contrast, by inclining the sensor central axis 15C with respect to the normal line of the surface of the paper P, reception of unnecessary ultrasound components such as multi-reflected ultrasounds may be reduced, which results in highly accurate double feed detection.

Detailed Configuration of Transmission Unit 151

Next, a more detailed configuration of the transmission unit 151 will be described. In the present embodiment, the reception unit 152 has the same configuration as that of the transmission unit 151, and thus detailed description and illustration of the reception unit 152 are omitted.

Figure 4:
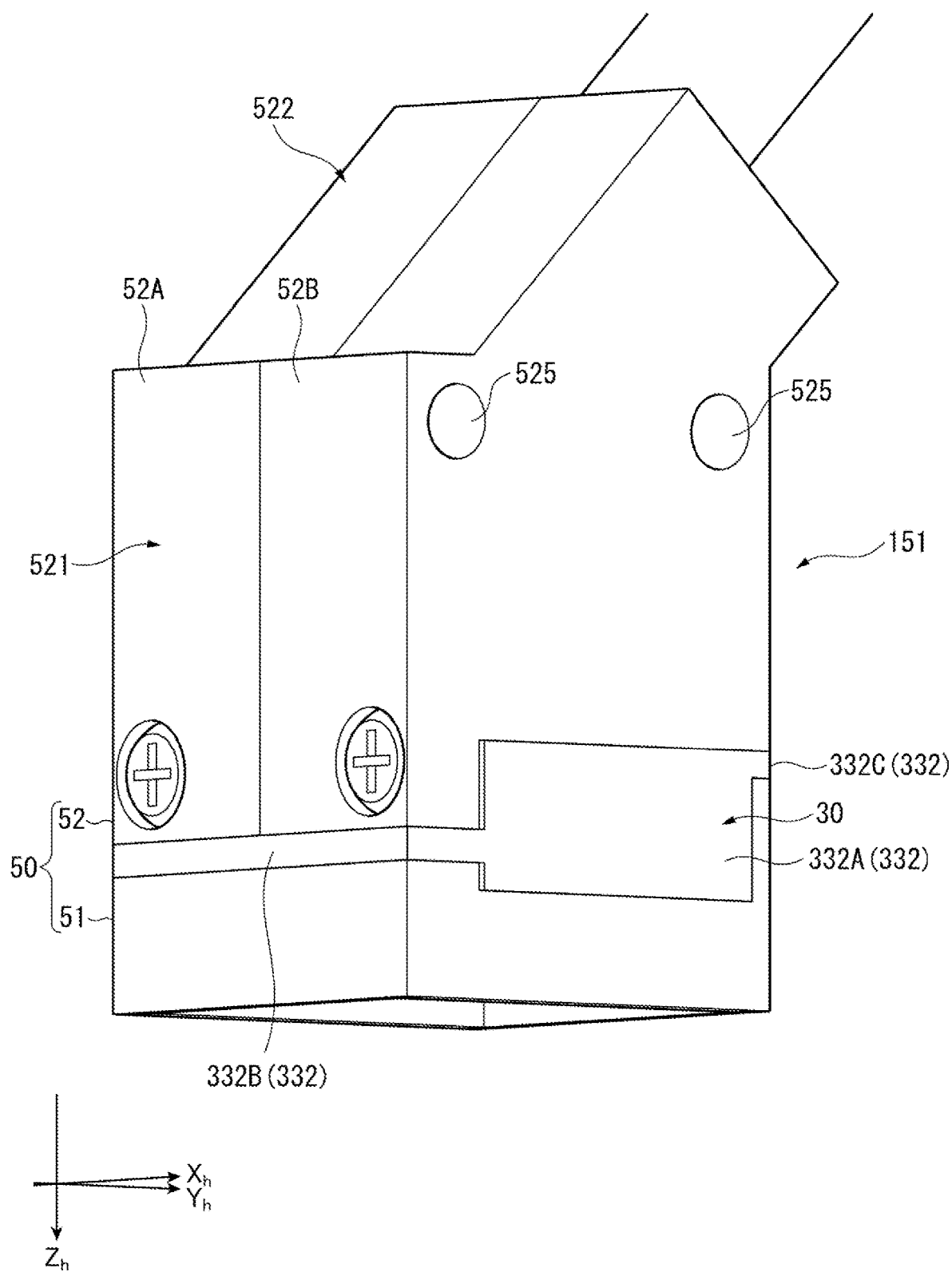
FIG. 4 is a perspective view showing a schematic configuration of a transmission unit according to the present embodiment.
Figure 5:
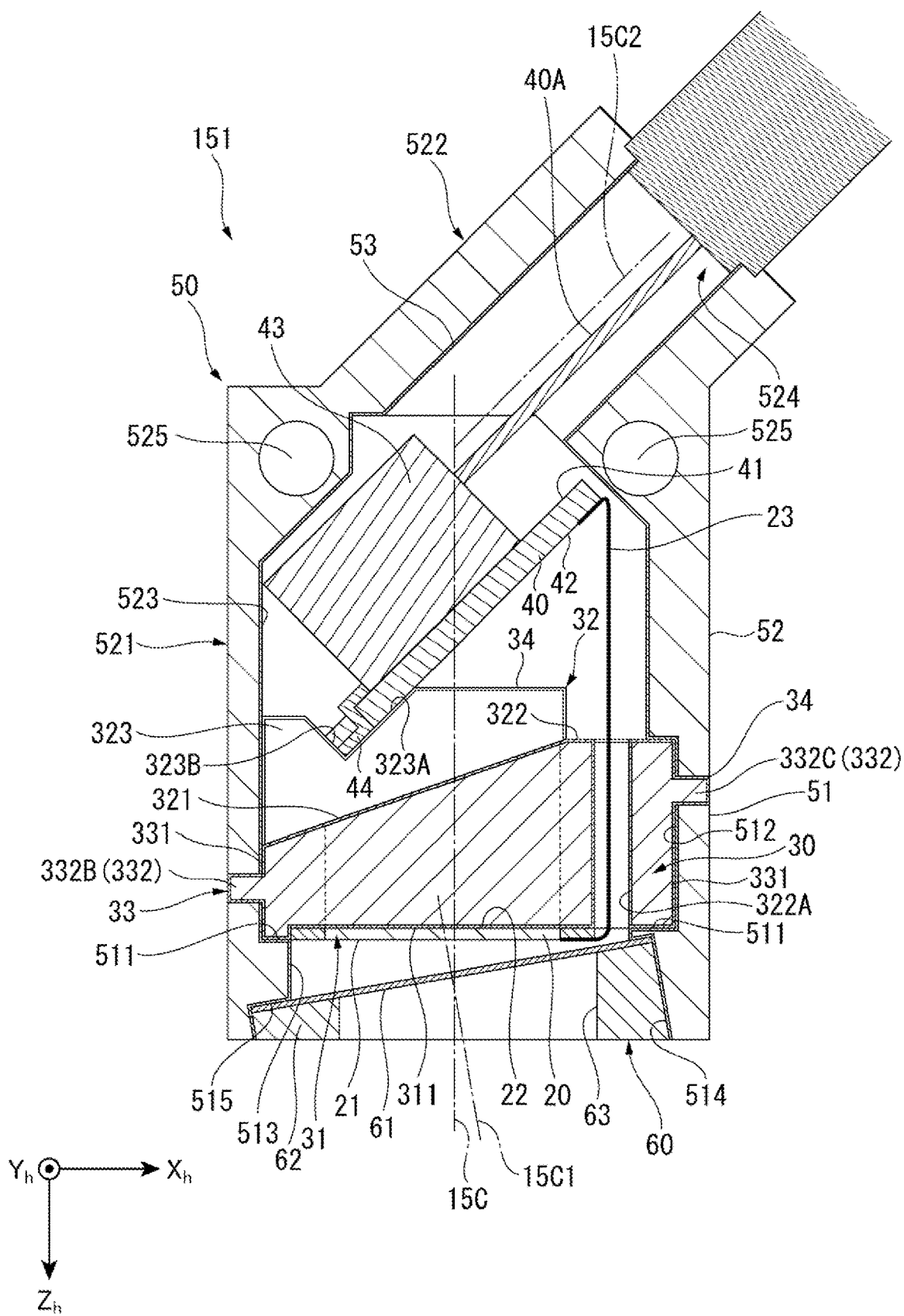
FIG. 5 is a cross-sectional view showing the transmission unit of the present embodiment taken along a sensor central axis.

FIG. 4 is a perspective view showing a schematic configuration of the transmission unit 151. FIG. 5 is a cross-sectional view of the transmission unit 151 taken along the sensor central axis 15C. In FIG. 5, in the following description, it is assumed that the direction parallel to the sensor central axis 15C is the Zh direction, the direction orthogonal to the Zh direction is the Xh direction, the direction orthogonal to the Zh and the Xh directions is the Yh direction, and ultrasounds are transmitted in the +Zh direction. FIG. 5 is a cross-sectional view of the transmission unit 151 taken along a plane parallel to an XhZh plane that includes the Xh direction and the Zh direction.

As shown in FIG. 5, the transmission unit 151 includes an ultrasound device 20, a holder 30, a circuit substrate 40, a case 50, and a protection unit 60.

Configuration of Ultrasound Device 20

The ultrasound device 20 is a sensor device configured by arranging a plurality of ultrasound transducers in an array, and is formed in a thin plate shape as shown in FIG. 5. The ultrasound device 20 includes a working surface 21 that transmits or receives ultrasounds and a fixed surface 22 opposite to the working surface 21, and the fixed surface 22 is fixed to the holder 30.

In the transmission unit 151, by applying a driving voltage to the ultrasound transducer, the ultrasound transducer vibrates and ultrasounds are transmitted along the sensor central axis 15C from the working surface 21 opposite to the holder 30 toward the transportation path 130. In the reception unit 152, the ultrasound device 20 having the same configuration as that of the transmission unit 151 is provided, and the ultrasound device 20 of the reception unit 152 is vibrated by the ultrasound input along the sensor central axis 15C, and then an electric signal (reception signal) in accordance with the vibration amplitude is output.

Configuration of Holder 30

The holder 30 is a member that holds the ultrasound device 20.

Figure 6:
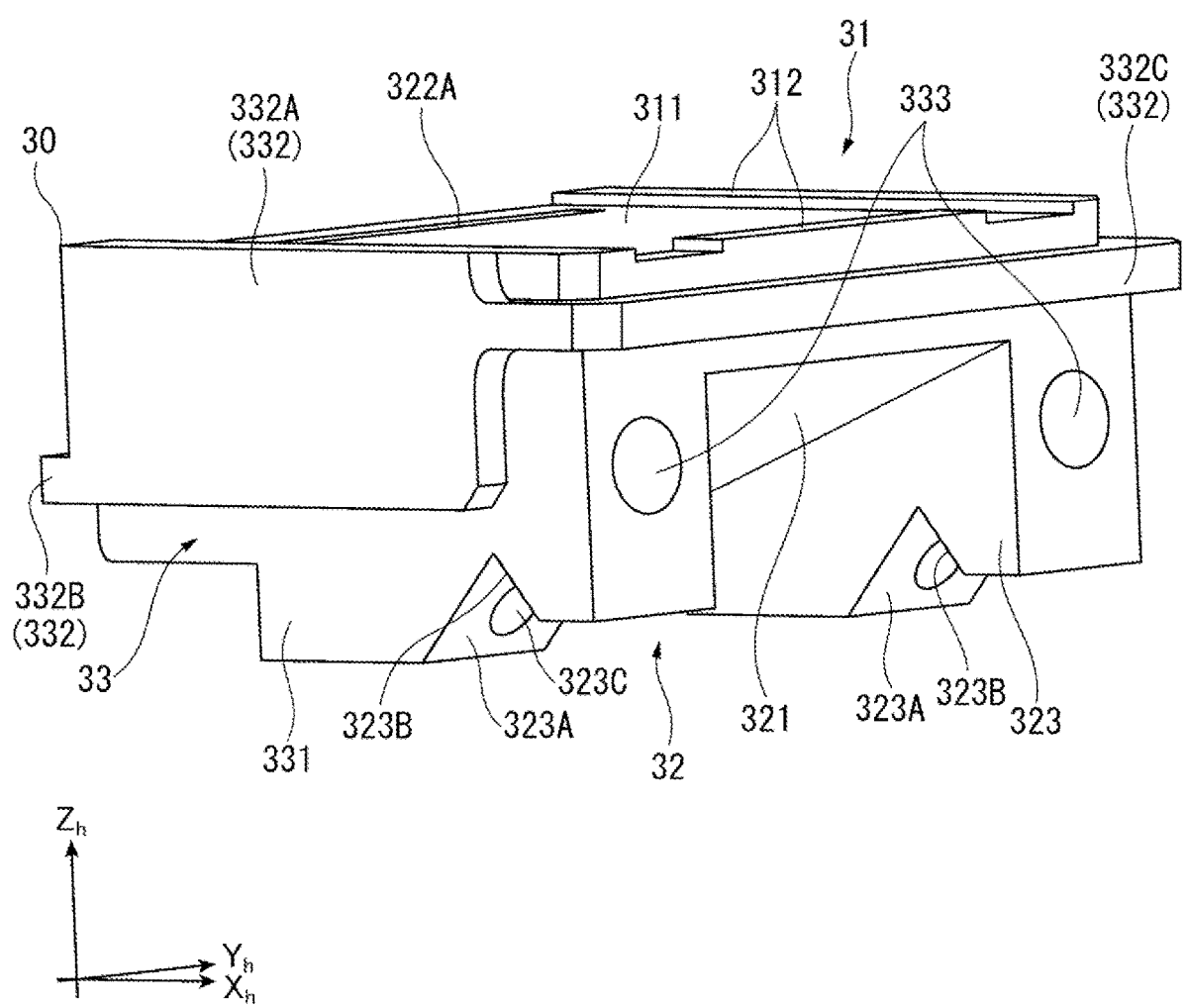
FIG. 6 is a perspective view showing a holder according to the present embodiment.
Figure 7:
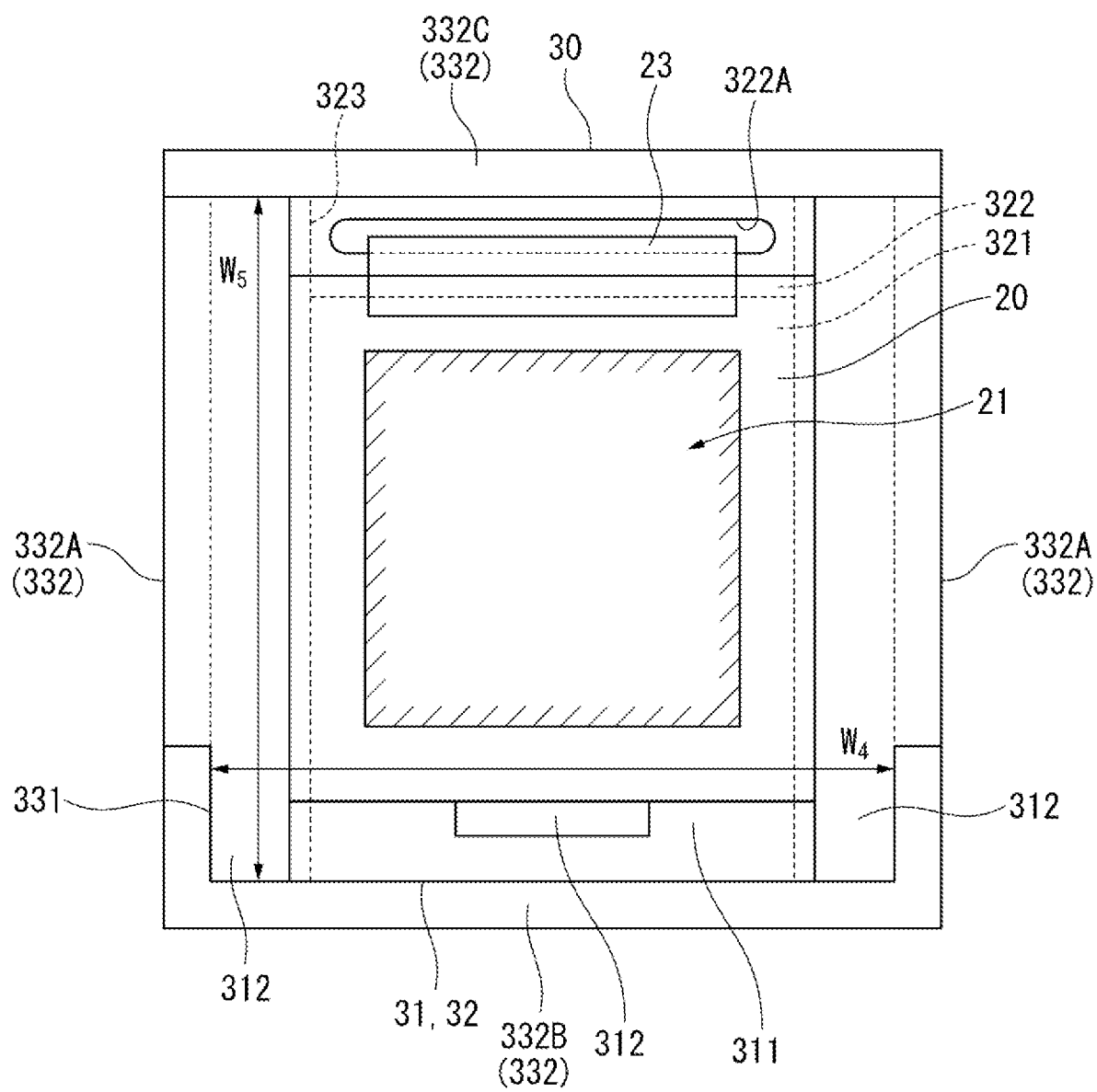
FIG. 7 is a plan view showing the holder that holds the ultrasound device according to the present embodiment when viewed from the +Zh side.

FIG. 6 is a perspective view showing the holder 30, and FIG. 7 is a plan view of the holder 30 holding the ultrasound device 20, when viewed from the +Zh side.

The holder 30 is a block-shaped member having a substantially rectangular shape in a plan view viewed from the sensor central axis 15C. The holder 30 includes a tip end side end surface 31 provided on the ultrasound transmission/reception direction, that is, on the side facing the transportation path 130, a base end side end surface 32 opposite to the tip end side end surface 31, and a peripheral surface portion 33 continuous from the tip end side end surface 31 and the base end side end surface 32.

The tip end side end surface 31 includes a bonding surface 311 orthogonal to the sensor central axis 15C. The fixed surface 22 of the ultrasound device 20 is bonded to the bonding surface 311 by a bonding member such as a double-sided tape or an adhesive.

In addition, the tip end side end surface 31 is provided with a plurality of positioning portions 312 for positioning the ultrasound device 20. In the present embodiment, as shown in FIGS. 6 and 7, the positioning portions 312 are each provided on the ±Yh sides and the −Xh side of the bonding surface 311, and come in contact with an edge of the ultrasound device 20, thereby positioning the ultrasound device 20.

The base end side end surface 32 includes an inclined end surface 321, a connection surface 322, and a substrate bonding portion 323.

The inclined end surface 321 is a surface of which normal line is inclined with respect to the sensor central axis 15C. As shown in FIG. 7, the inclined end surface 321 is provided at a position overlapping the working surface 21 of the ultrasound device 20 in a plan view viewed along the sensor central axis 15C. In the present embodiment, the example is shown, in which the inclined end surface 321 is inclined toward the −Zh side along the +Xh side, but the inclination direction of the inclined end surface 321 is not limited thereto. For example, the inclined end surface 321 may be inclined in the −Zh direction along the +Yh side, or may be inclined in other inclination directions.

As shown in FIG. 5, the connection surface 322 is a surface continuous from the inclined end surface 321 on the +Xh side of the inclined end surface 321. The holder 30 is provided with a wiring hole 322A penetrating from the connection surface 322 to the bonding surface 311, and a wiring 23 for connecting the ultrasound device 20 and the circuit substrate 40 is inserted into the wiring hole 322A. The wiring 23 may be a lead wire or flexible printed circuits (FPC), for example.

A pair of substrate bonding portions 323 are provided at both ends of the inclined end surface 321 in the Yh direction, with the inclined end surface 321 and the connection surface 322 interposed therebetween. The substrate bonding portion 323 protrudes further to the −Zh side than the inclined end surface 321 and the connection surface 322, and is provided with, at the protruding tip end side, a substrate bonding surface 323A with which the circuit substrate 40 comes into contact, and a substrate holder 323B that positions an end of the circuit substrate 40. Specifically, the substrate bonding surface 323A is a plane inclined with respect to the sensor central axis 15C, and is a plane substantially parallel to the extending direction of a wiring cable 40A connected to the circuit substrate 40. A substrate fixing hole 323C for fixing the circuit substrate 40 is provided in the substrate bonding surface 323A.

The substrate holder 323B includes a surface that rises in a direction of intersecting the substrate bonding surface 323A.

In order to fix the circuit substrate 40 to the substrate bonding portion 323, one end edge of the circuit substrate 40 is positioned to come in contact with the substrate holder 323B, and a back surface of the circuit substrate 40 is fixed to the substrate bonding portion 323 by screwing a fixing screw into the substrate fixing hole 323C from a fixing hole provided in the circuit substrate 40.

In such a holder 30, multi-reflections of ultrasounds transmitted from the ultrasound device 20 to the holder 30 side are suppressed. In other words, when ultrasounds are transmitted from the ultrasound device 20 in the transmission unit 151, the ultrasounds are transmitted not only in the direction from the working surface 21 toward the transportation path 130, but also in the direction from the fixed surface 22 toward the holder 30. Further, in the reception unit 152, the ultrasound received by the working surface 21 of the ultrasound device 20 may pass through the ultrasound device 20 to the holder 30 side.

Here, when the normal line of the inclined end surface 321 coincides with the sensor central axis 15C, the ultrasounds are multi-reflected between the inclined end surface 321 and the ultrasound device 20. When such multi-reflections of the ultrasounds occur in the transmission unit 151, they are superimposed on the ultrasounds from the working surface 21 toward the reception unit 152, and the sound pressure of the transmission ultrasounds varies, resulting in deteriorated accuracy of the double feed detection by the ultrasound sensor 15. In addition, when multi-reflections of ultrasounds occur in the reception unit 152, in addition to the ultrasounds originally intended to be received on the working surface 21, the multi-reflected ultrasounds are superimposed, and the ultrasounds due to multi-reflections are received at a different timing than the ultrasounds originally intended to be received, resulting in increased reception noise, and deteriorated accuracy of double feed detection.

In contrast, in the present embodiment, the normal line of the inclined end surface 321 is inclined with respect to the sensor central axis 15C. For this reason, even when the ultrasound is input from the ultrasound device 20 to the holder 30 side along the sensor central axis 15C, the inclined end surface 321 reflects this ultrasound in a direction different from the sensor central axis 15C. As a result, the deterioration of the double feed detection accuracy as described above may be suppressed.

Further, the back surface 42 of the circuit substrate 40 is inclined with respect to the sensor central axis 15C, so that even when the ultrasound input from the ultrasound device 20 to the holder 30 side passes through the inclined end surface 321 along the sensor central axis 15C and reaches the circuit substrate 40, it is reflected at the circuit substrate 40 in a direction inclined to the sensor central axis 15C. For this reason, the multi-reflection of the ultrasound between the circuit substrate 40 and the ultrasound device 20 is also suppressed.

Further, as shown in FIG. 7, the holder 30 has a shape in which the tip end side end surface 31 and the base end side end surface 32 overlap with each other in a plan view viewed from the Zh direction. That is, the dimension of the tip end side end surface 31 along the Yh direction and the dimension from the +Yh side end surface of the +Yh side of substrate bonding portion 323 to the -Yh side end surface of the -Yh side of substrate bonding portion 323 are the same as dimension $W_4$.

In addition, the dimension of the tip end side end surface 31 along the Xh direction and the dimension from the -Xh side edge of the inclined end surface 321 to the +Xh side edge of the connection surface 322 are the same as dimension $W_5$.

The peripheral surface portion 33 of the holder 30, when viewed from the Zh direction, includes a contact surface portion 331 disposed at a plane connecting an edge of the tip end side end surface 31 and an edge of the base end side end surface 32, and a protrusion 332 that rises from the contact surface portion 331.

The contact surface portion 331 forms a surface that comes in contact with the inner peripheral surface of the case 50.

The protrusion 332 protrudes from the contact surface portion 331 by the same dimension as the thickness of the case 50 or by a dimension greater than the thickness of the case 50. More specifically, the protrusion 332 includes exposed portions 332A protruding toward the ±Yh sides of the holder 30, a first flange 332B provided along the pair of exposed portions 332A to the contact surface portion 331 on the -Xh side, and a second flange 332C provided along the pair of exposed portions 332A to the contact surface portion 331 on the +Xh side.

This protrusion 332 is a portion that is exposed to the outside of the case 50 when the holder 30 is housed in the case 50.

The exposed portion 332A comes in contact with the transmission side mounting object 111 when the transmission unit 151 is fixed to the transmission side mounting object 111. Note that, in the present embodiment, the example is shown, in which one of the pair of exposed portions 332A comes in contact with the transmission side mounting object 111, but when the transmission unit 151 is interposed and held between the pair of transmission side mounting objects 111, both of the exposed portions 332A come in contact with the transmission side mounting object 111.

The first flange 332B and the second flange 332C are portions that are interposed between a first case 51 and a second case 52 that construct the case 50 described below. The relative position of the holder 30 with respect to the case 50 may be determined by the first flange 332B and the second flange 332C.

Further, as shown in FIG. 6, the peripheral surface portion 33 is provided with a holder fixing hole 333 for fixing the holder 30 to the case 50. In the present embodiment, two holder fixing holes 333 are each provided in the contact surface portion 331 on the ±Xh sides of the peripheral surface portion 33.

In the holder 30 of the present embodiment, as shown in FIG. 5, each surface of the tip end side end surface 31, the base end side end surface 32, and the peripheral surface portion 33 is covered with a holder side conductive layer 34. For this reason, when the transmission unit 151 is fixed to the transmission side mounting object 111 and the exposed portion 332A comes in contact with the transmission side mounting object 111, the holder 30 and the transmission side mounting object 111 are electrically connected to have the same potential.

The transmission side mounting object 111 and the reception side mounting object 112 are other electric drive members provided in the image scanner 10, and may be exemplified by a frame of a motor drive control unit that drives and controls the transport motor 135, a frame of the scanning unit 14, a frame of the control unit 16, and the like. These electric drive members incorporated in the electronic device need to be set to common reference potential (ground potential) in order to eliminate the influences of noise and the like. When the ultrasound sensor 15 is mounted on the frame of the electric drive member, in related art, it is necessary to provide a frame ground terminal on the frame of the electric drive member of the mounting object and connect each holder 30 of the ultrasound sensor 15 to the frame ground terminal provided on the casing of the electric drive member of the mounting object by a lead wire. On the other hand, in the present embodiment, the protrusion 332 of the holder 30 is exposed outside the case 50. Therefore, when the transmission unit 151 and the reception unit 152 of the ultrasound sensor 15 are fixed to the frame of the electric drive member of the mounting object, that is, to the transmission side mounting object 111 and the reception side mounting object 112, the exposed portion 332A is directly contacted, so that the holder 30 and the mounting objects 111 and 112 may be electrically connected to each other and may be maintained at the common ground potential.

Configuration of Circuit Substrate 40

The circuit substrate 40 is fixed to the substrate bonding surface 323A of the holder 30 as described above. The circuit substrate 40 may incorporate a drive circuit for driving the ultrasound device 20. In addition, the circuit substrate 40 may be a relay circuit connecting the driving circuit provided outside the transmission unit 151 and the ultrasound device 20.

The circuit substrate 40 has a circuit surface 41 and a back surface 42. A connector 43 is provided on the circuit surface 41, and a wiring cable 40A is connected thereto. The wiring cable 40A is extended substantially parallel to the plane direction of the circuit substrate 40 and is drawn out of the transmission unit 151 from a cable port 524 provided in the second case 52. In addition to a control line for transmitting and receiving a control signal for driving the ultrasound device 20 or an output signal from the ultrasound device 20, a frame ground line to be applied with a predetermined reference potential (ground potential) is included in the wiring cable 40A. The circuit substrate 40 includes a ground electrode 44 connected to the frame ground line, and the ground electrode 44 is extended to the back surface 42 of the circuit substrate 40.

When the back surface 42 comes in contact with the substrate bonding surface 323A and the circuit substrate 40 is fixed to the holder 30, the ground electrode 44 provided on the back surface 42 and the holder side conductive layer 34 on the surface of the holder 30 come in contact with each other, resulting in the surface of the holder 30 having a ground potential. As a result, the transmission side mounting object 111 that comes in contact with the holder 30 also has the ground potential.

Configuration of Case 50

The case 50 is a case made of synthetic resin and holds the holder 30 as it is interposed between the ±Zh sides.

Figure 8:
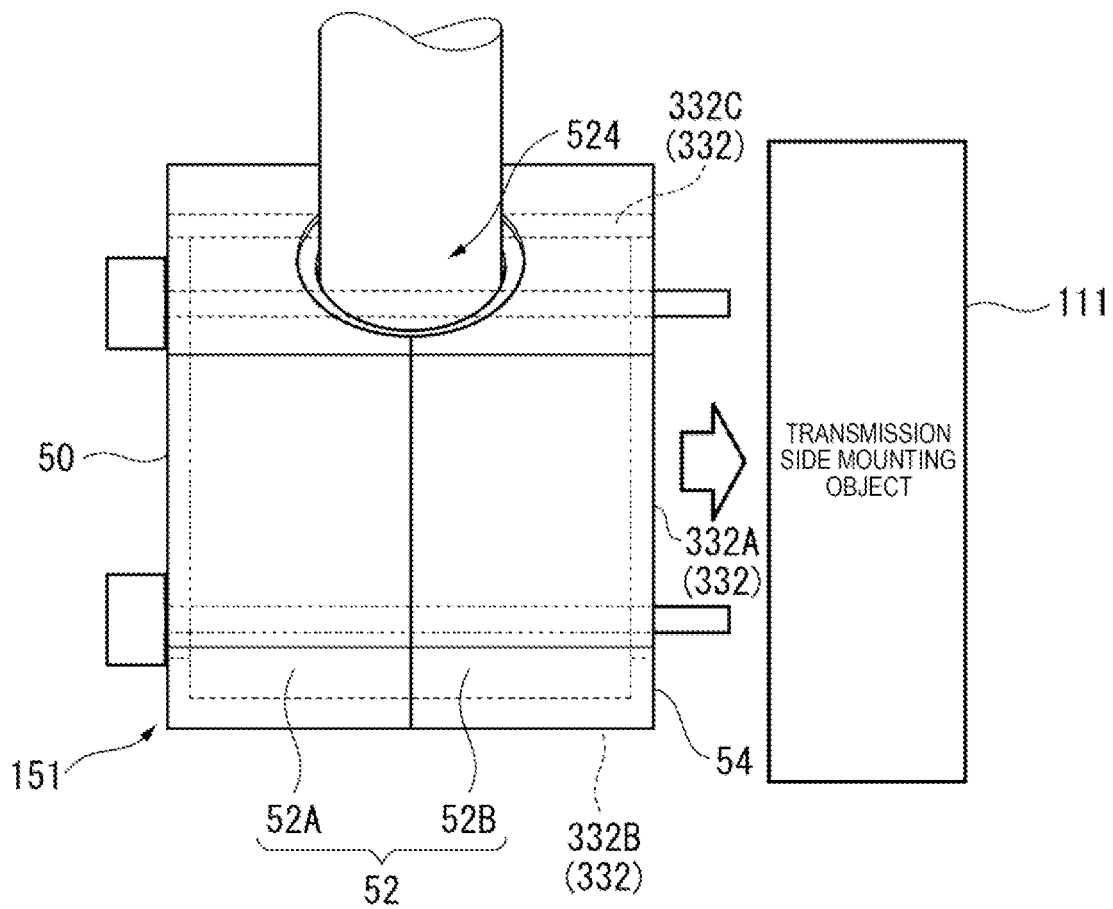
FIG. 8 is a plan view showing the transmission unit according to the present embodiment when viewed from the −Zh side.

FIG. 8 is a plan view showing the transmission unit 151 when viewed from the −Zh side.

As shown in FIGS. 4, 5, and 8, the case 50 includes the first case 51 and the second case 52.

The first case 51 is a substantially cylindrical member and has a rectangular cylindrical cross section. The first case 51 is provided on the +Zh side of the holder 30, with an end portion on the −Zh side being formed along the +Zh side end surface of the protrusion 332 and coming in contact with the +Zh side end surface of the protrusion 332.

As shown in FIG. 5, a holding surface 511 along a plane orthogonal to the sensor central axis 15C is provided on the inner peripheral portion of the first case 51. A part along the outer peripheral edge of the tip end side end surface 31 of the holder 30 comes in contact with the holding surface 511. The first case 51 includes a first inner peripheral surface 512 that rises from the outer peripheral edge of the holding surface 511 to the −Zh side. The first inner peripheral surface 512 has the same shape as the cross-sectional shape orthogonal to the sensor central axis 15C of the tip end side end surface 31 of the holder 30, and has a dimension of $W_4$ in the Yh direction and a dimension of $W_5$ in the Xh direction. Therefore, a surface of the contact surface portion 331 of the holder 30 located on the +Zh side with respect to the protrusion 332 comes in contact with the first inner peripheral surface 512.

On the −Zh side of the first case 51, a first passage hole 513 is provided along the sensor central axis 15C.

In the first passage hole 513, the ultrasound device 20 fixed to the holder 30 is disposed to face to each other. On the +Zh side of the first case 51, a second passage hole 514 that opens on the transportation path 130 side and communicates with the first passage hole 513 is provided. The second passage hole 514 is a hole portion having a first inclined center axis 15C1 inclined with respect to the sensor central axis 15C, and has a diameter greater than that of the first passage hole 513. Between the first passage hole 513 and the second passage hole 514, a stepped surface 515 connecting between the opening edge on the +Zh side of the first passage hole 513 and the outer peripheral edge of the second passage hole 514 is provided. The stepped surface 515 is a plane orthogonal to the first inclined center axis 15C1, and the protection unit 60 is installed on the stepped surface 515.

The protection unit 60 includes a protection member 61 and a cap 62 that fixes the protection member 61.

The protection member 61 is a plate-like member that allows ultrasounds to pass along the sensor central axis 15C, while suppressing intrusion of foreign matters such as paper dust into the first case 51. For example, the protection member 61 may be formed in a mesh shape in which a plurality of wire rods are arranged in parallel or arranged in a direction of intersecting with each other. Further, the protection member 61 may have a configuration in which a plurality of through holes are formed in a plate-like member. The shape of the through hole is not particularly limited, and may be circular, polygonal, or the opening size or shape of each through hole may be different from each other. Furthermore, the protection member 61 may be formed by a porous member formed with a nonwoven fabric or a foam material that has an open cell structure.

Such a protection member 61 is disposed along the stepped surface 515. For this reason, the normal line of the protection member 61 is inclined with respect to the sensor central axis 15C. Therefore, the multi-reflection between the ultrasound device and the protection member 61 may be suppressed, and the deterioration of the double feed detection accuracy due to the multi-reflection may be suppressed.

The cap 62 is a member fitted into the second passage hole 514, and holds the protection member 61 interposed between the cap 62 itself and the stepped surface 515. The cap 62 is provided with a third passage hole 63 penetrating along the sensor central axis 15C. For this reason, the ultrasound output from the ultrasound device 20 of the transmission unit 151 passes through the first passage hole 513, the hole provided in the protection member 61, and the third passage hole 63 along the sensor central axis 15C to be transmitted to the transportation path 130 side. In the reception unit 152, the ultrasound device 20 receives ultrasounds input through the third passage hole 63, the hole provided in the protection member 61, and the first passage hole 513 along the sensor central axis 15C.

As shown in FIGS. 4 and 8, the second case 52 includes a male case 52A and a female case 52B that are symmetrical with respect to a plane that passes through the sensor central axis 15C and is parallel to the XhZh plane.

The second case 52 is provided on the −Zh side of the holder 30, with an end on the +Zh side being formed along the −Zh side end surface of the protrusion 332, and coming in contact with the −Zh side end surface of the protrusion 332.

The second case 52 is a substantially cylindrical member by combining the male case 52A and the female case 52B, and includes a first cylinder 521 in a cylindrical shape that has the sensor central axis 15C as the central axis, and a second cylinder 522 in a cylindrical shape that has, as the central axis, a second inclined central axis 15C2 inclined with respect to the sensor central axis 15C.

A portion of the holder 30 and the circuit substrate 40 fixed to the holder 30 are disposed at the inner periphery of the first cylinder 521. The second inner peripheral surface 523, which is the inner peripheral surface of the first cylinder 521, has the same shape as the cross-sectional shape orthogonal to the sensor central axis 15C of the base end side end surface 32 of the holder 30, and has a dimension of $W_4$ in the Yh direction and a dimension of $W_5$ in the Xh direction. Accordingly, a surface of the contact surface portion 331 of the holder 30 that is located on the −Zh side with respect to the protrusion 332 comes in contact with the second inner peripheral surface 523.

The second cylinder 522 is provided in communication with the first cylinder 521, and includes the wiring cable 40A disposed in connection with the circuit substrate 40. The cable port 524 for drawing out the wiring cable 40A to the outside is provided at the opening end of the second cylinder 522 opposite to the first cylinder 521.

In the case 50 as described above, the gap between the first case 51 and the second case 52 serves as a communication portion that causes the inside and the outside of the case 50 to communicate with each other, and the protrusion 332 is disposed to be interposed between the first case 51 and the second case 52 and exposed to the outer side of the case 50 from the communication portion.

In the present embodiment, as shown in FIG. 5, by applying a conductive paint such as metal plating, the case side conductive layer 53 is formed on the inner peripheral surface of the case 50, that is, on the holding surface 511, the first inner peripheral surface 512, the inner peripheral surface of the first passage hole 513, the inner peripheral surface of the second passage hole 514, the second inner peripheral surface 523 of the first cylinder 521, and the inner peripheral surface of the second cylinder 522. In the case 50, the first inner peripheral surface 512 and the second inner peripheral surface 523 come in contact with the holder 30, so that the case side conductive layer 53 and the holder side conductive layer 34 come in contact with each other and have the same potential. That is, in the case 50 according to the present embodiment, the first inner peripheral surface 512 and the second inner peripheral surface 523 that surround the holder 30 form an inner peripheral wall of the accommodation portion that houses the holder 30, and the case side conductive layer 53 is disposed that surrounds the holder 30 and is maintained at the ground potential. The case side conductive layer 53 of the case 50 may provide a shielding effect and may protect the ultrasound device 20 from static electricity and electromagnetic waves.

In the transmission unit 151 as described above, either side surface of ±Yh sides comes in contact with the transmission side mounting object 111, and is screwed to the transmission side mounting object 111 by inserting a fixing screw into a through hole 525 provided in the second case 52 along the Yh direction. In the present embodiment, as shown in FIG. 8, the +Yh side surface of the case 50 is a mounting surface 54 that comes in contact with the transmission side mounting object 111. For this reason, the exposed portion 332A of the holder 30 exposed from the side surface on the +Yh side of the transmission unit 151 contacts the transmission side mounting object 111. The holder side conductive layer 34 is provided on the surface of the holder 30, so that the reference potential of the transmission unit 151 and the transmission side mounting object 111 may be set to the same ground potential by bringing the exposed portion 332A into contact with the transmission side mounting object 111.

Circuit Configuration of Ultrasound Sensor 15

Figure 9:
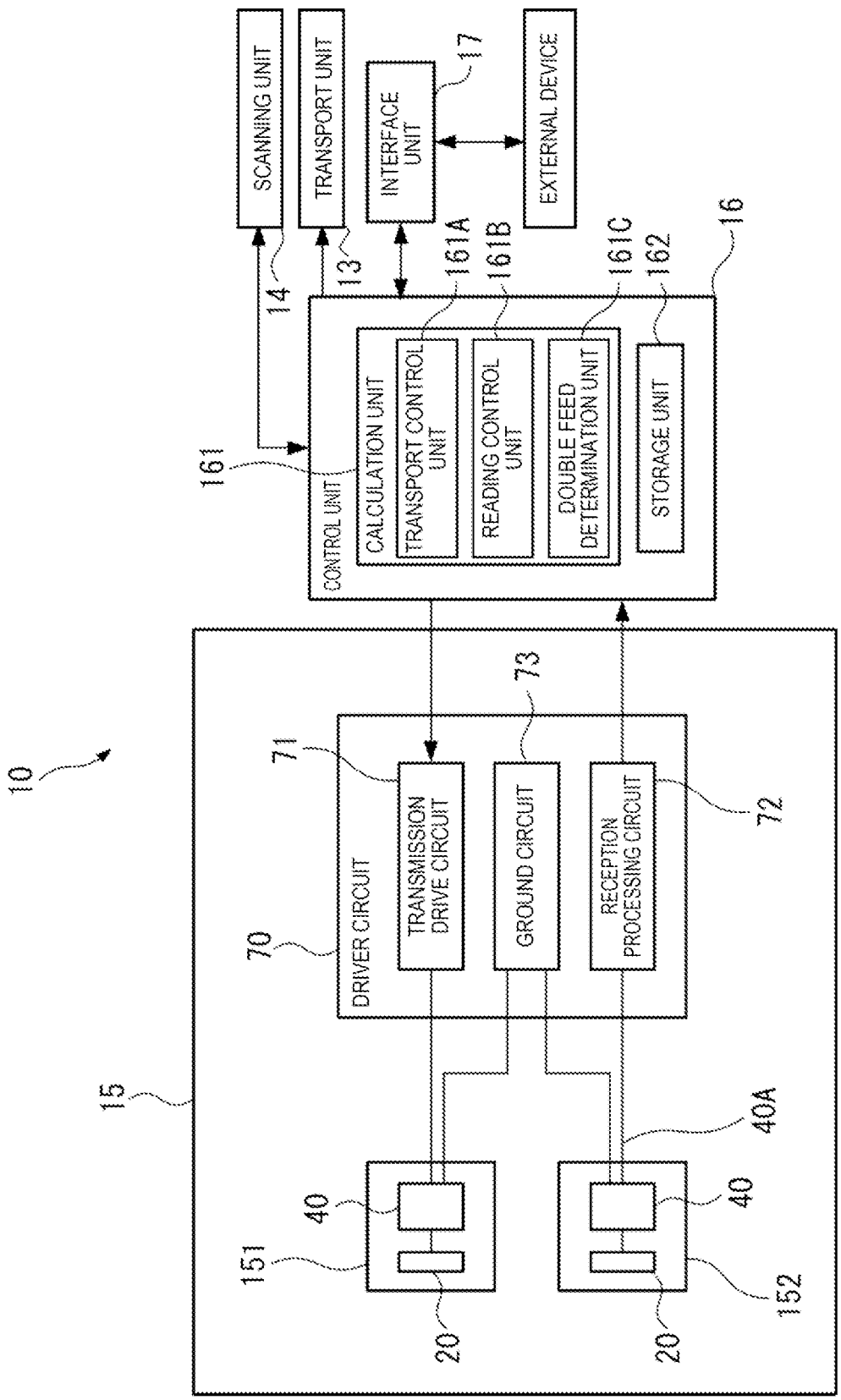
FIG. 9 is a block diagram showing a control configuration of the image scanner according to the present embodiment.

FIG. 9 is a block diagram showing a control configuration of the image scanner 10.

The ultrasound sensor 15 according to the present embodiment includes a driver circuit 70, and the driver circuit 70 is provided with a transmission drive circuit 71, a reception processing circuit 72, and a ground circuit 73. In the present embodiment, the example is shown, in which the driver circuit 70 is provided separately from the transmission unit 151 and the reception unit 152 and connected by the wiring cable 40A, although the present disclosure is not limited thereto. For example, the transmission drive circuit 71 may be incorporated in the circuit substrate 40 in the transmission unit 151, and the reception processing circuit 72 may be incorporated in the circuit substrate 40 of the reception unit 152.

The transmission drive circuit 71 is connected to the ultrasound device 20 provided in the transmission unit 151, and generates a drive signal that drives each ultrasound device 20.

The reception processing circuit 72 processes a reception signal output from the ultrasound device 20 provided in the reception unit 152 and outputs the processed signal to the control unit 16.

The frame ground line is connected to the ground circuit 73 to apply a ground potential thereto. The ground circuit 73 is connected to the housing of the apparatus main body 11 of the image scanner 10, and each electrical component in the image scanner 10, that is, the drive circuit of the transport motor 135, the scanning unit 14, the ultrasound sensor 15, and the reference potential of the control unit 16 is maintained at the common ground potential.

Configuration of Control Unit 16

As shown in FIG. 9, the control unit 16 includes a calculation unit 161 formed of a central processing unit (CPU) and the like, and a storage unit 162 formed of a recording circuit such as a memory. The control unit 16 is connected to the transport motor 135 of the transport unit 13, the scanning unit 14, and the ultrasound sensor 15, and controls driving of the transport motor 135, the scanning unit 14, and the ultrasound sensor 15.

In addition, the control unit 16 is connected to an interface unit 17 and receives various data and signals input from an external device such as a personal computer, and outputs read data read by the image scanner 10 to the external device.

The storage unit 162 stores various data and various programs for controlling the image scanner 10.

The calculation unit 161 reads and executes various programs stored in the storage unit 162, thereby serving as a transport control unit 161A, a reading control unit 161B, a double feed determination unit 161C, and the like as shown in FIG. 9.

The transport control unit 161A controls the transport motor 135 of the transport unit 13 to rotate a plurality of roller pairs 131 to 134, thereby feeding the paper P set on the paper support 12 into the apparatus main body 11 one by one. Further, the transport control unit 161A transports the fed paper P along the transportation path 130.

The reading control unit 161B controls the scanning unit 14 to read the image of the paper P while the paper P is being transported.

The double feed determination unit 161C is a state detection unit that detects the state of the paper P, and in the present embodiment, it controls the ultrasound sensor 15 to determine double feed of the paper P based on the reception signal input from the reception unit 152.

Specifically, when the voltage value of the reception signal is smaller than a predetermined threshold value, it is determined that the paper P is being double fed. Note that, when the double feed determination unit 161C determines the double feed, the transport control unit 161A stops the transport of the paper P.

Operational Effect of the Present Embodiment

The image scanner 10 according to the present embodiment includes the transmission unit 151 that forms the ultrasound sensor 15 and the transmission side mounting object 111 that fixes the transmission unit 151.

The transmission unit 151 includes the ultrasound device 20, the holder 30 that holds the ultrasound device 20 and includes the holder side conductive layer 34 formed on the surface thereof so as to be maintained at a ground potential, and the case 50 that houses the holder 30. The case 50 includes the first case 51 and the second case 52, and the protrusion 332 of the holder 30 protrudes from the gap between the first case 51 and the second case 52 that construct the communication portion, and when the mounting surface 54 of the case 50 comes in contact with and fixed to the transmission side mounting object 111, the protrusion 332 also comes in contact with the transmission side mounting object 111.

For this reason, when the transmission unit 151 is mounted to the transmission side mounting object 111, the frame ground line for connecting the transmission unit 151 and the transmission side mounting object 111 is not necessary, and the transmission unit 151 and the transmission side mounting object 111 may be grounded with a simple configuration.

The same applies to the reception unit 152, that is, like the transmission unit 151, the reception unit 152 and the reception side mounting object 112 may be grounded with a simple configuration.

The ultrasound sensor 15 according to the present embodiment includes the circuit substrate 40 provided with wiring for controlling the driving of the ultrasound device 20, and the circuit substrate 40 includes the ground electrode 44 to which a ground potential is applied, and the holder 30 comes in contact with the ground electrode 44.

For this reason, when the circuit substrate 40 is fixed to the holder 30, the surface of the holder 30 may be maintained at the ground potential, and terminals and lead wires for connecting the holder 30 and the circuit substrate 40 may be eliminated.

In the ultrasound sensor 15 according to the present embodiment, in the case 50, the accommodation portion that houses the holder 30 is formed of the first inner peripheral surface 512 of the first case 51 and the second inner peripheral surface 523 of the second case 52, and the case side conductive layer 53 is provided on the first inner peripheral surface 512 and the second inner peripheral surface 523 which are the inner peripheral walls of the accommodation portion. That is, the outer periphery of the holder 30 is surrounded by the case side conductive layer 53 in contact with the holder side conductive layer 34 of the holder 30, and so a shielding effect, which protects the ultrasound device 20 from static electricity and electromagnetic waves, may be obtained.

In the present embodiment, the case 50 includes the first case 51 and the second case 52, and the communication portion is formed by a gap between the first case 51 and the second case 52 such that the protrusion 332 of the holder 30 is interposed between the first case 51 and the second case 52.

For this reason, the holder 30 may be easily positioned with respect to the case 50 by bringing the edges of the first case 51 and the second case 52 into contact with the protrusion 332 of the holder 30.

MODIFICATION EXAMPLES

Note that the present disclosure is not limited to the embodiments described above, and configurations obtained by modifying, improving, and appropriately combining the embodiments within the scope of achieving the object of the present disclosure are included in the present disclosure.

Modification Example 1

In the embodiment described above, the example is shown, in which the transmission unit 151 includes the exposed portion 332A exposed to the +Yh side in contact with the transmission side mounting object 111, but the present disclosure is not limited thereto.

For example, the exposed portion 332A exposed on the −Yh side of the transmission unit 151 may come in contact with the transmission side mounting object 111. Further, when the transmission unit 151 is disposed to be interposed between the two transmission side mounting objects 111, both of the pair of exposed portions 332A exposed on the ±Yh sides may come in contact with the transmission side mounting object 111.

Further, in the case 50, the side surface on the −Xh side or the side surface on the +Xh side may be used as the mounting surface 54 for fixing to the transmission side mounting object 111, in which case it is preferable that the first flange 332B or the second flange 332C are configured to come in contact with the transmission side mounting object 111.

Note that the same applies to the reception unit 152.

Modification Example 2

In the embodiment described above, the example is shown, in which the holder 30 is configured such that the protrusion 332 having the pair of exposed portions 332A, the first flange 332B, and the second flange 332C, is provided to surround the circumferential direction of the holder 30, and the protrusion 332 protrudes from the gap between the first case 51 and the second case 52. Meanwhile, it may be configured to provide a communication hole in the mounting surface of a substantially cylindrical case, to communicate between the inside and outside of the case. In this case, it is preferable that the holder is configured to include a protrusion that protrudes to the outside of the case through the communication hole.

For example, when the side surface on the +Yh side of the case is fixed to the transmission side mounting object 111 as a mounting surface, it may be configured such that the communication hole is provided on the +Yh side of the case, and the holder is provided with only one protrusion that is exposed outside the case from the communication hole.

Further, the −Zh side of the case may be the mounting surface. In this case, it may be configured such that the communication hole is provided in the side end surface of the case on the −Zh side, and the protrusion is provided in a portion on the −Zh side of the holder, protruding from the case to the −Zh side to be exposed.

Modification Example 3

In the embodiment described above, the case side conductive layer 53 is provided on the first inner peripheral surface 512 and the second inner peripheral surface 523 of the case 50 and comes in contact with the holder side conductive layer 34 of the holder 30, but the present disclosure is not limited thereto.

For example, when the case 50 is formed of conductive resin, the case side conductive layer 53 may not be provided. Further, when the case 50 does not need to have a shielding effect, the case side conductive layer 53 may not be provided.

Modification Example 4

The configuration is illustrated, in which the holder side conductive layer 34 is provided on the surface of the holder 30, but the present disclosure is not limited thereto. For example, when the holder 30 is formed of a conductive resin, a metal member, and the like, the holder side conductive layer 34 may not be provided.

Further, the holder side conductive layer 34 may be provided on a portion of the holder 30. That is, it may be configured such that the holder side conductive layer 34 is provided along the substrate bonding surface 323A in contact with the ground electrode 44 of the circuit substrate 40, to the exposed portion 332A in contact with the mounting objects 111 and 112, and even in this case, the holder 30 and the mounting objects 111 and 112 may still be conducted.

Modification Example 5

In the embodiment described above, the image scanner 10 is illustrated as an example of the electronic device, but the present disclosure is not limited thereto. In the printing apparatus (printer) provided with a print head for printing an image on the printing paper transported on the transportation path 130, the ultrasound sensor 15 as described above may be employed to detect double feed of the printing paper.

In addition, in such a printing apparatus, the ultrasound sensor 15 may be used to determine the type of printing paper. In other words, in a storage unit for storing, the printing apparatus stores table data in which the signal intensity of the reception signal from the reception unit 152 is associated with the type of printing paper. Thus, the control unit (computer) provided in the printing apparatus serves as a state detection unit, and references to the table data to determine the type of printing paper corresponding to the reception signal from the reception unit 152. In this case, the printing apparatus may form an optimal image corresponding to the type of printing paper on the printing paper.

Further, the target object is not limited to the paper P or the printing paper, and may be a film, a fabric, and the like as described above.

Furthermore, the ultrasound sensor 15 as described above may be applied to a flow rate detection device that detects the flow rate of a fluid flowing through a pipe or the like. That is, when an ultrasound is transmitted to a fluid that is a target object and the ultrasound that passes through the fluid is received, the traveling direction of the ultrasound is changed in accordance with the flow rate of the fluid. At this time, the flow rate of the fluid may be measured by detecting a change in the voltage value of the reception signal. In such a flow rate detection device, in order to measure the flow rate of the fluid from the change in the voltage of the reception signal, it is necessary to set the reference position with the sound axis of the ultrasound transmitted from the transmission unit accurately directed to the reception unit. By using the ultrasound sensor as described above, the reference position may be set accurately, and the accuracy of the flow rate detection at the flow rate detection device may be improved.

Moreover, in the embodiment described above, the ultrasound sensor 15 is illustrated, which is provided with the transmission unit 151 that transmits an ultrasound, and the reception unit 152 that receives an ultrasound. Meanwhile, an ultrasound device may be formed only of a transmission unit that transmits ultrasounds, or an ultrasound device may be formed only of a reception unit that receives ultrasounds.

For example, in an ultrasound device such as a data transmission device that transmits data by ultrasounds, an insect repellent device or an animal repellent device that repels insects or animals using ultrasounds, or a tactile transmission device that uses ultrasounds for haptics, only the transmission unit may be provided. Further, in an ultrasound device such as a data receiving device that receives an ultrasound signal transmitted from a data transmitting device using ultrasounds, it may be configured such that only a reception unit is provided.

Furthermore, the example is shown, in which the transmission unit and the reception unit are separately provided in the ultrasound device, but it may be configured such that one transmission/reception unit that performs transmission/reception processing of the ultrasounds is provided. In this case, the ultrasound is transmitted from the transmission/reception unit to the measurement object, and the reflected ultrasound reflected by the measurement object and returned to the transmission/reception unit is received. In this case, it may be used for a distance measurement sensor that measures the distance from the ultrasound sensor to the measurement object based on the time period from the timing at which the transmission/reception unit transmits ultrasounds to the timing at which the transmission/reception unit receives reflected ultrasounds.

Modification Example 6

Furthermore, the ultrasound device 20 that transmits ultrasounds or receives ultrasounds is illustrated as a sensor device, but the present disclosure is not limited thereto.

For example, the sensor device may be a laser device and the like that measures the surface shape of the measurement object by emitting laser light and receiving the laser light reflected by the measurement object. Even in this case, when the sensor unit equipped with the laser device is mounted to the mounting object, the sensor unit and the mounting object may be set to the same ground potential by exposing a portion of the holder that holds the laser device from the case and bringing the portion of the holder into contact with the mounting object.

In addition, the specific structure for realizing the present disclosure may be configured by appropriately combining the embodiments and modification examples described above within the scope that can achieve the object of the present disclosure, and may be appropriately changed to other structures and the like.

What is claimed is:

1. A sensor unit comprising:
   a sensor device;
   a holder that holds the sensor device and of which a surface is maintained at a reference potential; and
   a case that houses the holder within the case, wherein
   the case includes a mounting surface that comes in contact with a mounting object,
   the mounting surface is provided with a communication portion that causes an inside and an outside of the case to communicate with each other, and
   the holder includes a protrusion that protrudes from the inside of the case to the outside of the case via the communication portion and comes in contact with the mounting object.

2. The sensor unit according to claim 1, wherein the sensor device is an ultrasound device that performs at least one of transmission of ultrasounds and reception of ultrasounds.

3. The sensor unit according to claim 2, further comprising:
   a circuit substrate that controls driving of the ultrasound device; wherein
   the circuit substrate includes a ground electrode to which the reference potential is applied, and
   the holder is in contact with the ground electrode of the circuit substrate.

4. The sensor unit according to claim 1, wherein
   the case includes an accommodation portion that houses the holder, and
   an inner peripheral wall of the accommodation portion is provided with a conductive layer surrounding the holder and coming in contact with the holder.

5. The sensor unit according to claim 1, wherein
   the case includes a first case and a second case, and the communication portion is formed by a gap between the first case and the second case, and
   the protrusion is interposed between the first case and the second case.

6. An electronic device comprising:
   the sensor unit according to claim 1; and
   the mounting object to which the mounting surface of the case is mounted and with which the protrusion comes in contact.

* * * * *